United States Patent [19]

Nasin et al.

[11] Patent Number: 5,623,750

[45] Date of Patent: Apr. 29, 1997

[54] ADJUSTABLE ELASTIC AND INELASTIC STRAP APPARATUS

[76] Inventors: Jarrod A. Nasin, 184 Kahn Rd.; John H. Marcotte, III, 232 Pleasure Hill Rd., both of Franklin, Conn. 06254

[21] Appl. No.: 512,095

[22] Filed: Aug. 7, 1995

[51] Int. Cl.[6] ............................ B65D 63/00; A44B 11/00
[52] U.S. Cl. ........................... 24/68 CD; 24/300; 24/301
[58] Field of Search ............................. 24/68 CD, 68 R, 24/300, 301, 302, 715.3; 410/100, 105, 110

[56] References Cited

U.S. PATENT DOCUMENTS

| | | |
|---|---|---|
| D. 287,099 | 12/1986 | Cory . |
| 1,519,854 | 12/1924 | Lockwood ............................... 24/300 |
| 2,539,997 | 1/1951 | Graves ................................. 24/68 CD |
| 4,358,232 | 11/1982 | Griffith ................................. 410/100 |
| 4,769,875 | 9/1988 | Hartman . |
| 4,823,443 | 4/1989 | Waters . |
| 4,884,928 | 12/1989 | Nachtigall et al. ..................... 410/100 |
| 5,271,127 | 12/1993 | Christensen . |
| 5,325,568 | 7/1994 | Bruhm . |
| 5,377,391 | 1/1995 | Foster .................................. 24/301 |
| 5,402,557 | 4/1995 | Dalen ................................. 24/68 CD |
| 5,423,644 | 6/1995 | First, Sr. ............................... 410/100 |

FOREIGN PATENT DOCUMENTS 1297146  11/1972  United Kingdom ............... 24/68 CD

*Primary Examiner*—Victor N. Sakran

[57] ABSTRACT

An adjustable elastic and inelastic strap apparatus includes a first connector and a flexible elastic strap assembly which has a first end and a second end. The first end of the elastic strap assembly is attached to the first connector. A second connector is connected to the second end of the elastic strap assembly. A flexible inelastic strap assembly is connected to the second connector. The inelastic strap assembly includes a strap-length-adjustment assembly and an inelastic strap adjustably connected to the strap-length-adjustment assembly. The strap-length-adjustment assembly is employed for adjusting an effective length of the inelastic strap assembly between a first end of the inelastic strap assembly and a second end of the inelastic strap assembly. A third connector is connected to the second end of the inelastic strap assembly. The inelastic strap includes a first end, which is a free end, and includes a second end which is connected to the third connector. The strap-length-adjustment assembly includes a support structure. A slot is provided in the support structure for receiving the first end of the inelastic strap. A clamp base portion of the support structure contacts a portion of the inelastic strap; and a locking assembly, supported by the support structure, locks the portion of the inelastic strap against the clamp base portion.

8 Claims, 2 Drawing Sheets

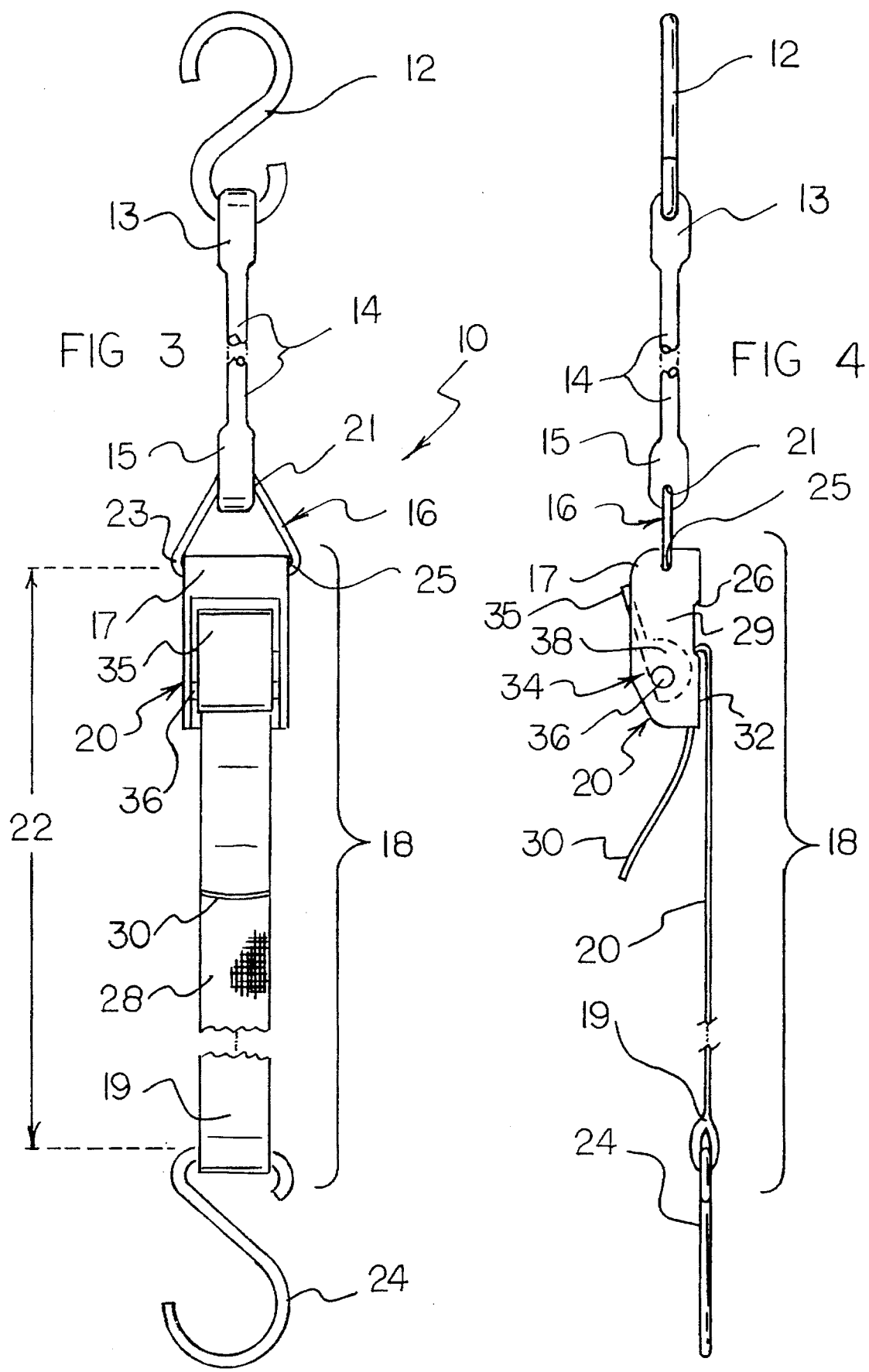

ADJUSTABLE ELASTIC AND INELASTIC STRAP APPARATUS

BACKGROUND OF THE INVENTION

1. Field of the Invention

The present invention relates generally to adjustable straps and cords and, more particularly, to adjustable straps and cords especially adapted for tying objects down or for connecting objects together.

2. Description of the Prior Art

For tying objects down, generally either one or the other of two types of tie-down devices are employed. Either the tie-down device is flexible and inelastic, or the tie-down device is flexible and elastic. The flexible and inelastic tie-down devices are generally composed of a flexible and inelastic strap, a length-adjusting device for adjusting the effective length of the flexible and inelastic strap, and a hook at each end. The hooks are used for connecting the tie-down device to a stationary base. A problem often associated with a flexible and inelastic tie-down device is the presence of slack. Often, slack is present because the flexible and inelastic tie-down device cannot be both adequately tightened and adequately locked into its effective length at the same time. Often, the flexible and inelastic device is pulled to be tightened, but the pulling and tightness must be lessened in order to lock the length-adjusting device at the desired effective length of the flexible and inelastic strap. In this respect, it would be desirable if a tie-down device that contains a flexible and inelastic strap were provided which can be adequately tightened and adjusted in its effective length without introducing slack into the flexible and inelastic strap.

The flexible and elastic tie-down devices are generally composed of a flexible and elastic strap and a hook at each end. The flexible and elastic tie-down devices generally employ a cord like a "bungee" cord whose elasticity is not exceeded by the tie-down operation. With the flexible and elastic tie-down device, a length adjusting device is generally not present because the effective length of the flexible and elastic device is adjusted by virtue of the degree of stretch of the flexible and elastic device. Yet, because the elasticity of the flexible and elastic cords are not exceeded with this type of tie-down device, the objects that are tied down may not be tied down in a rigid manner. The ever-present elasticity of the flexible and elastic cords prevent tying down objects in a rigid manner. In this respect, it would be desirable if a tie-down device that contains flexible and elastic cords were provided that can tie down objects in a rigid manner.

Throughout the years, a number of innovations have been developed relating to tie-down devices, and the following U.S. Pat. Nos. are representative of some of those innovations: 4,769,875; 4,823,443; 5,271,127; 5,325,568; and Des. 287,099. More specifically, U.S. Pat. No. 4,769,875 discloses an elastic reinforced tie-down strap which includes a core of nonstretchable reinforcing filament formed in a series of closed loops which surround anchor holes. The loops of nonstretchable material serve to reinforce and prevent tearing of the anchor holes. Because the nonstretchable filaments are formed as loops, the nonstretchable material (which is in essence inelastic), in effect, becomes stretchable or elastic when in use. In this respect, it would be desirable if a tie-down device were provided which includes inelastic material which remains inelastic when in use.

U.S. Pat. Nos. 4,823,443, 5,271,127, and 5,325,568 disclose flexible and inelastic tie-down devices which include various length-adjustment mechanisms. None of the devices in U.S. Pat. Nos. 4,823,443, 5,271,127, and 5,325,568 discloses elastic strap components used in conjunction with flexible and inelastic tie-down devices which employ length-adjusting mechanisms. In view of benefits obtained from using elastic components in tie-down devices, it would be desirable if a tie-down device were provided which includes a flexible and inelastic strap, a length-adjusting mechanism for the flexible and inelastic strap, and an elastic component.

U.S. Pat. No. Des. 287,099 discloses an elastic tie-down device which does not include a flexible and inelastic strap and does not include a length-adjusting mechanism for a flexible and inelastic strap.

Still other features would be desirable in a tie-down device that includes a flexible and inelastic strap, a length-adjusting mechanism for the flexible and inelastic strap, and an elastic component. For example, to readily obtain the benefits of both a flexible and inelastic strap and a flexible and elastic strap simultaneously, it would be desirable if the flexible and inelastic strap and the flexible and elastic strap were arranged in an in-line or serial arrangement.

When using a flexible and inelastic strap and length-adjusting mechanism, it is often necessary for a person to use one hand for removing slack and using the other hand for adjusting the effective length of the strap with the length-adjusting mechanism. The use of two hands to tighten a tie-down device may be very inconvenient. In this respect, it would be desirable if a tie-down device were provided which permitted a one-handed tightening operation.

Thus, while the foregoing body of prior art indicates it to be well known to use a tie-down device, the prior art described above does not teach or suggest a tie-down device which has the following combination of desirable features: (1) contains a flexible and inelastic strap which can be adequately tightened and adjusted in its effective length without introducing slack into the flexible and inelastic strap; (2) contains flexible and elastic cords that can tie down objects in a rigid manner; (3) includes inelastic material which remains inelastic when in use; (4) includes a flexible and inelastic strap, a length-adjusting mechanism for the flexible and inelastic strap, and an elastic component; (5) provides a flexible and inelastic strap and a flexible and elastic strap which are arranged in an in-line or serial arrangement; and (6) permits a one-handed tightening operation. The foregoing desired characteristics are provided by the unique adjustable elastic and inelastic strap apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an adjustable elastic and inelastic strap apparatus which includes a first connector and a flexible elastic strap assembly which has a first end and a second end. The first end of the elastic strap assembly is attached to the first connector. A second connector is connected to the second end of the elastic strap assembly. A flexible inelastic strap assembly is connected to the second connector. The inelastic strap assembly includes a strap-length-adjustment assembly and an inelastic strap adjustably connected to the strap-length-adjustment assembly. The strap-length-adjustment assembly is employed for adjusting an effective length of the inelastic strap assembly between a first end of the inelastic strap assembly and a second end of the inelastic strap assembly. A third connector is connected to the second end of the inelastic strap assembly.

The first connector can be an S-shaped hook. The third connector can be an S-shaped hook. The second connector can be a triangle-shaped connector. In this case, an apex of the triangle-shaped connector is connected to the second end of the elastic strap assembly, and two apexes and of the triangle-shaped connector are connected to the strap-length-adjustment assembly of the inelastic strap assembly. The inelastic strap includes a first end, which is a free end, and includes a second end which is connected to the third connector.

The strap-length-adjustment assembly includes a support structure. A slot is provided in the support structure for receiving the first end of the inelastic strap. A clamp base portion of the support structure contacts a portion of the inelastic strap; and a locking assembly, supported by the support structure, locks the portion of the inelastic strap against the clamp base portion.

The locking assembly includes a pivot member supported by the support structure and a manually operated locking cam supported by the pivot member. The locking cam is located adjacent to the clamp base portion for clamping a portion of the inelastic strap between the locking cam and the clamp base portion for locking the inelastic strap with respect to the strap-length-adjustment assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable elastic and inelastic strap apparatus which has all of the advantages of the prior art and none of the disadvantages.

It is another object of the present invention to provide a new and improved adjustable elastic and inelastic strap apparatus which may be easily and efficiently manufactured and marketed.

It is a further object of the present invention to provide a new and improved adjustable elastic and inelastic strap apparatus which is of durable and reliable construction.

An even further object of the present invention is to provide a new and improved adjustable elastic and inelastic strap apparatus which is susceptible of a low cost of manufacture with regard to both materials and labor, and which accordingly is then susceptible of low prices of sale to the consuming public, thereby making such adjustable elastic and inelastic strap apparatus available to the buying public.

Still yet a further object of the present invention is to provide a new and improved adjustable elastic and inelastic strap apparatus which contains a flexible and inelastic strap which can be adequately tightened and adjusted in its effective length without introducing slack into the flexible and inelastic strap.

Still another object of the present invention is to provide a new and improved adjustable elastic and inelastic strap apparatus that contains flexible and elastic cords that can tie down objects in a rigid manner.

Yet another object of the present invention is to provide a new and improved adjustable elastic and inelastic strap apparatus which includes inelastic material which remains inelastic when in use.

Even another object of the present invention is to provide a new and improved adjustable elastic and inelastic strap apparatus that includes a flexible and inelastic strap, a length-adjusting mechanism for the flexible and inelastic strap, and an elastic component.

Still a further object of the present invention is to provide a new and improved adjustable elastic and inelastic strap apparatus which provides a flexible and inelastic strap and a flexible and elastic strap which are arranged in an in-line or serial arrangement.

Yet another object of the present invention is to provide a new and improved adjustable elastic and inelastic strap apparatus that permits a one-handed tightening operation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a top view of the embodiment of the invention shown in FIG. 1 removed from the vehicle roof.

FIG. 4 is a side view of the embodiment of the invention shown in FIG. 3.

DESCRIPTION OF THE PREFERRED EMBODIMENT

Figure 1:
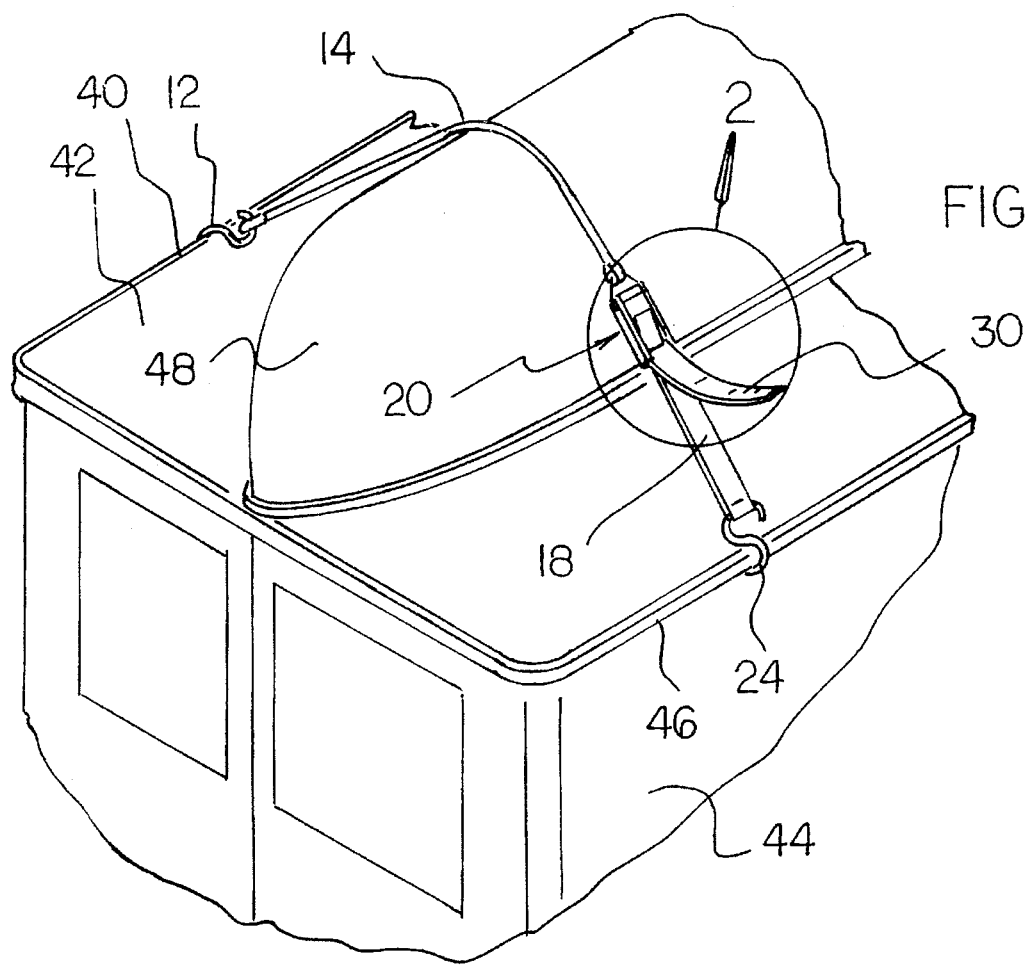
FIG. 1 is a perspective view showing a preferred embodiment of the adjustable elastic and inelastic strap apparatus of the invention in use on a vehicle roof strapping down an object on the roof.
Figure 2:
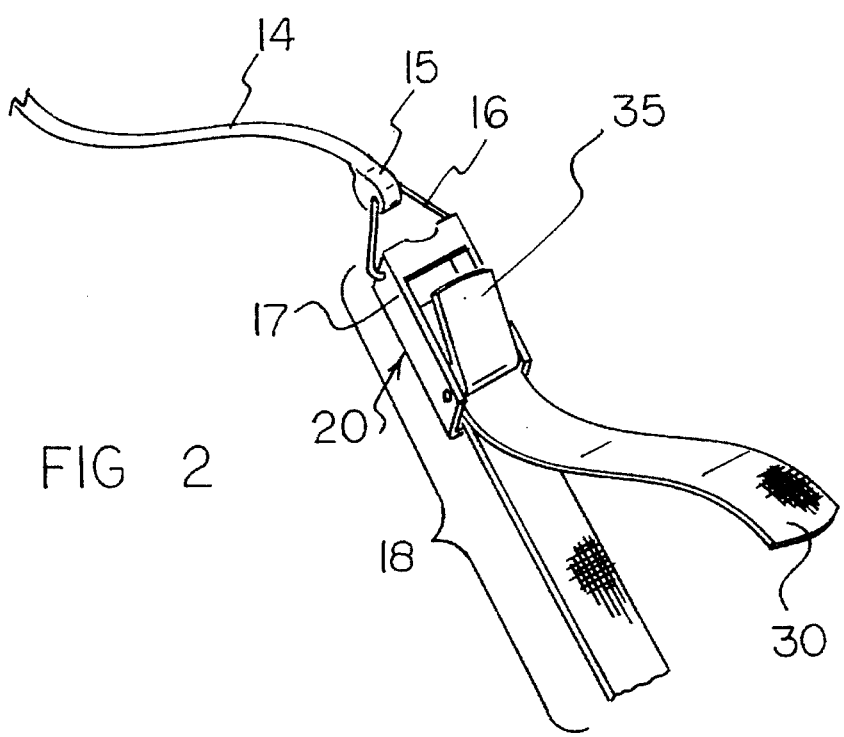
FIG. 2 is an enlarged perspective view of the portion of the embodiment of the invention shown in FIG. 1 that is contained in the circled region 2 of FIG. 1.

With reference to the drawings, a new and improved adjustable elastic and inelastic strap apparatus embodying the principles and concepts of the present invention will be described.

Turning to FIGS. 1–4, there is shown an exemplary embodiment of the adjustable elastic and inelastic strap apparatus of the invention generally designated by reference numeral 10. In its preferred form, the adjustable elastic and inelastic strap apparatus 10 includes a first connector 12 and a flexible elastic strap assembly 14 which has a first end 13 and a second end 15. The first end 13 of the elastic strap assembly 14 is attached to the first connector 12. A second connector 16 is connected to the second end 15 of the elastic strap assembly 14. A flexible inelastic strap assembly 18 is connected to the second connector 16. The inelastic strap assembly 18 includes a strap-length-adjustment assembly 20 and an inelastic strap 28 adjustably connected to the strap-length-adjustment assembly 20. The strap-length-adjustment assembly 20 is employed for adjusting an effective length 22 of the inelastic strap assembly 18 between a first end 17 of the inelastic strap assembly 18 and a second end 19 of the inelastic strap assembly 18. A third connector 24 is connected to the second end 19 of the inelastic strap assembly 18.

The first connector 12 can be an S-shaped hook 12. Other suitable forms of the first connector 12 can also be employed. The third connector 24 can be an S-shaped hook 24. Also, other suitable forms of the third connector 24 can also be employed. The second connector 16 can be a triangle-shaped connector 16. In this case, an apex 21 of the triangle-shaped connector 16 is connected to the second end 15 of the elastic strap assembly 14, and two apexes 23 and 25 of the triangle-shaped connector 16 are connected to the strap-length-adjustment assembly 20 of the inelastic strap assembly 18.

The inelastic strap 28 includes a first end 30, which is a free end, and includes a second end 19 which is connected to the third connector 24.

The strap-length-adjustment assembly 20 includes a support structure 29. A slot 26 is provided in the support structure 29 for receiving the first end 30 of the inelastic strap 28. A clamp base portion 32 of the support structure 29 contacts a portion of the inelastic strap 28; and a locking assembly 34, supported by the support structure 29, locks the portion of the inelastic strap 28 against the clamp base portion 32.

The locking assembly 34 includes a pivot member 36 supported by the support structure 29 and a manually operated locking cam 38 supported by the pivot member 36. The locking cam 38 is located adjacent to the clamp base portion 32 for clamping a portion of the inelastic strap 28 between the locking cam 38 and the clamp base portion 32 for locking the inelastic strap 28 with respect to the strap-length-adjustment assembly 20.

Aside from the strap-length-adjustment assembly 20 disclosed in the drawings, other suitable strap-length-adjustment assemblies can also be employed. For example, the strap-length-adjustment assemblies disclosed in U.S. Pat. Nos. 4,823,443, 5,271,127, and 5,325,568 may also be employed. In this respect, U.S. Pat. Nos. 4,823,443, 5,271,127, and 5,325,568 are incorporated herein by reference.

In using the adjustable elastic and inelastic strap apparatus 10 of the invention, the S-shaped hook 12 is attached to one portion of a first flange 40 on a roof 42 of a motor vehicle 44. The S-shaped hook 24 is attached to one portion of a second flange 46 on the roof 42. A portion of the main body of the adjustable elastic and inelastic strap apparatus 10 is placed over an article to be secured to the roof 42 of the motor vehicle 44. As shown in FIG. 1, the article is a boat 48. The handle portion 35 of the locking assembly 34 is lifted so that the locking cam 38 is not pressing in a clamping manner against a portion of the inelastic strap 28 against the clamp base portion 32 of the strap-length-adjustment assembly 20. The first end 30 of the inelastic strap 28 is grasped by one hand of a user, and the inelastic strap 28 is pulled so that it becomes taut. The elastic strap assembly 14 provides a counterforce to the tension resulting from pulling on the inelastic strap 28. When the boat 48 is held down by a desired hold-down force, the tautness of the adjustable elastic and inelastic strap apparatus 10 is locked by manually adjusting the handle portion 35 of the locking assembly 34 so that a portion of the taut inelastic strap 28 is clamped between the locking cam 38 and the clamp base portion 32.

It is noted that the degree of tautness of both the inelastic strap 28 and the elastic strap assembly 14 is determined by the elastic modulus of the elastic strap assembly 14. It is noted that to increase the elastic force (and therefore the tautness) provided between the first connector 12 and the inelastic strap assembly 18, additional elastic strap assemblies 14 can be employed and connected between the S-shaped hook 12 and the inelastic strap assembly 18.

A wide variety of selection parameters can be used with respect to the elastic strap assembly 14. For example, the elastic strap assembly 14 can vary with respect to its length, its thickness, and its elastic modulus. For convenience, the elastic strap assembly 14 can be fabricated from a well known "bungee" cord elastic material.

The components of the adjustable elastic and inelastic strap apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved adjustable elastic and inelastic strap apparatus that is low in cost, relatively simple in design and operation, and which may advantageously be used to contain a flexible and inelastic strap and to be adequately tightened and adjusted in its effective length without introducing slack into the flexible and inelastic strap. With the invention, an adjustable elastic and inelastic strap apparatus is provided which contains flexible and elastic cords that can tie down objects in a rigid manner. With the invention, an adjustable elastic and inelastic strap apparatus is provided which includes inelastic material which remains inelastic when in use. With the invention, an adjustable elastic and inelastic strap apparatus is provided which includes a flexible and inelastic strap, a length-adjusting mechanism for the flexible and inelastic strap, and an elastic component. With the invention, an adjustable elastic and inelastic strap apparatus provides a flexible and inelastic strap and a flexible and elastic strap which are arranged in an in-line or serial arrangement. With the invention, an adjustable elastic and inelastic strap apparatus is provided which permits a one-handed tightening operation.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An adjustable elastic and inelastic strap apparatus, comprising:

a first connector, a flexible elastic strap assembly having a first end and a second end, wherein said first end of said elastic strap assembly is attached to said first connector, a second connector connected to said second end of said elastic strap assembly, a flexible inelastic strap assembly connected to said second connector, wherein said first connector, said flexible elastic strap assembly, said second connector, and said flexible inelastic strap assembly are connected in series, wherein said inelastic strap assembly includes a strap-length-adjustment assembly and an inelastic strap adjustably connected to said strap-length-adjustment assembly, wherein said strap-length-adjustment assembly is employed for adjusting an effective length of said inelastic strap assembly between a first end of said inelastic strap assembly and a second end of said inelastic strap assembly, and a third connector connected to said second end of said inelastic strap assembly.

2. The apparatus of claim 1 wherein said first connector is an S-shaped hook.

3. The apparatus of claim 1 wherein said third connector is an S-shaped hook.

4. The apparatus of claim 1 wherein:

said second connector is a triangle-shaped connector, an apex of said triangle-shaped connector is connected to said second end of said elastic strap assembly, and two apexes and of said triangle-shaped connector are connected to said strap-length-adjustment assembly of said inelastic strap assembly.

5. The apparatus of claim 1 wherein said inelastic strap includes a first end which is a free end and a second end connected to said third connector.

6. The apparatus of claim 5 wherein said strap-length-adjustment assembly includes:

a support structure, a slot in said support structure for receiving said first end of said inelastic strap, a clamp base portion of said support structure for contacting a portion of said inelastic strap, and a locking assembly, supported by said support structure, for locking said portion of said inelastic strap against said clamp base portion.

7. The apparatus of claim 6 wherein said locking assembly includes:

a pivot member supported by said support structure, and a manually operated locking cam supported by said pivot member.

8. The apparatus of claim 7 wherein said locking cam is located adjacent to said clamp base portion for clamping a portion of said inelastic strap between said locking cam and said clamp base portion for locking said inelastic strap with respect to said strap-length-adjustment assembly.

* * * * *